No. 697,113. Patented Apr. 8, 1902.
S. TANNAHILL, Jr.
FERTILIZER DISTRIBUTING ATTACHMENT FOR CULTIVATORS.
(Application filed July 18, 1901.)
(No Model.)
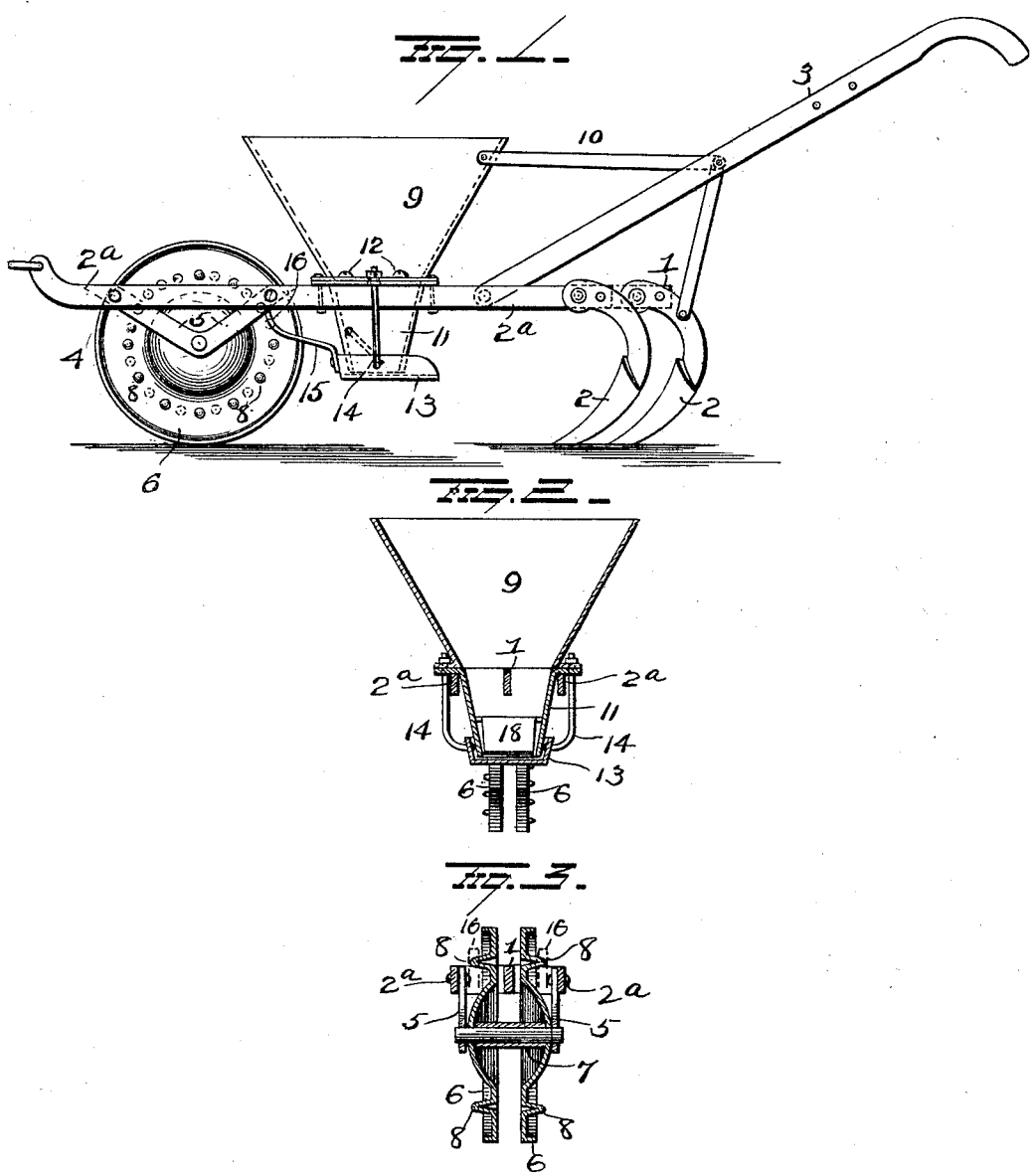
WITNESSES
INVENTOR
S. Tannahill, Jr.
By H. G. Seymour
Attorney
THE NORRIS PETERS CO., PHOTO-LITHO., WASHINGTON, D. C.

UNITED STATES PATENT OFFICE.

SAMUEL TANNAHILL, JR., OF AUGUSTA, GEORGIA.

FERTILIZER-DISTRIBUTING ATTACHMENT FOR CULTIVATORS.

SPECIFICATION forming part of Letters Patent No. 697,113, dated April 8, 1902.

Application filed July 18, 1901. Serial No. 68,827. (No model.)

*To all whom it may concern:*

Be it known that I, SAMUEL TANNAHILL, Jr., a resident of Augusta, in the county of Richmond and State of Georgia, have invented certain new and useful Improvements in Fertilizer-Distributing Attachments for Cultivators; and I do hereby declare the following to be a full, clear, and exact description of the invention, such as will enable others skilled in the art to which it appertains to make and use the same.

My invention relates to an improved fertilizer-distributing attachment for cultivators, the object of the invention being to provide an attachment of this character which can be readily placed in position on a cultivator and automatically distribute the fertilizer.

A further object is to provide an attachment of this character which will be extremely simple in construction, cheap to manufacture, and perfect in its operation.

With these objects in view the invention consists in certain novel features of construction and combinations and arrangements of parts, as will be more fully hereinafter described, and pointed out in the claims.

In the accompanying drawings, Figure 1 is a view in elevation, illustrating my improvements. Fig. 2 is a view in transverse section, and Fig. 3 is a sectional view of the wheel.

1 represents the central beam of a cultivator, having secured thereto at its rear end the standard of a tooth 2, and at its forward end bars 2ª are attached, said bars having the standards of other teeth 2 secured to their rear ends. Suitable handles 3 are attached to central beam 1 and extend rearward and upward therefrom.

At the forward end of beam 1 a wheel 4 is supported in bearings between the ends of U-shaped brackets 5, secured at their respective ends to the beam, and said wheel comprises parallel metal disks 6, spaced apart, having outwardly-bulged centers, securing between them a hub 7 and having outwardly-projecting flanges at their periphery forming the rim of the wheel. A series of fingers or pins 8 are punched from each of said disks and are arranged in circular formation and equidistant apart, for a purpose which will be hereinafter explained.

Secured to the beam 1 is a hopper 9 for fertilizer connected with the handles by brace-rods 10. This hopper is preferably composed of sheet metal flanged at its lower end, secured to a corresponding flange on the upper end of a spout 11 by bolts or screws 12.

Below spout 11 and normally closing the same a swinging distributer 13 is located and suspended on links 14, pivotally connected at their upper ends to the flanged meeting ends of the hopper and spout. To the forward end of the distributer 13 a fork 15 is secured, and the respective members of said fork 15 project on opposite sides of wheel 4 and are bent as shown at 16, forming inclined shoulders to be struck by the fingers or pins 8 and tilt the distributer and scatter the fertilizer over the ground in advance of the teeth of the cultivator. A suitable sliding shutter 18 is preferably provided in spout 11 to regulate the passage of the fertilizer.

Various slight changes might be resorted to in the general form and arrangement of the several parts described without departing from the spirit and scope of the invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In an attachment for cultivators, the combination with a beam, of a hopper secured on the beam and having a flanged lower end, a spout below the beam, a flange on the upper end of said spout secured to the flange at the bottom of the hopper, a distributer, links secured to the flanges and pivotally supporting the distributer, and means for shaking the latter.

2. In an attachment for cultivators, the combination with a beam, of a hopper secured on the beam and having a flanged lower end, a spout below the beam, a flange on the upper end of said spout secured to the flange at the bottom of the hopper, a distributer, links secured to the flanges and pivotally supporting the distributer, means in the spout for regulating the discharge of fertilizer and means for shaking the distributer.

3. In an attachment for cultivators, the combination with a beam, of a hopper thereon, a shaking distributer below the hopper, a wheel revolubly supported on the beam and comprising two metal disks, fingers punched from the disks and alternately disposed around the same, and a yoke secured to the distributer and adapted to be alternately engaged by the teeth on the opposite sides of said wheel to shake the distributer.

In testimony whereof I have signed this specification in the presence of two subscribing witnesses.

SAMUEL TANNAHILL, JR.

Witnesses:
JAS. L. COOPER,
W. J. RIVERS.